United States Patent [19]

Takahashi et al.

[11] Patent Number: 5,703,605
[45] Date of Patent: Dec. 30, 1997

[54] IMAGE DISPLAY APPARATUS

[75] Inventors: Koichi Takahashi; Yoichi Iba, both of Hachoji, Japan

[73] Assignee: Olympus Optical Co., Ltd., Tokyo, Japan

[21] Appl. No.: 567,231

[22] Filed: Dec. 5, 1995

[30] Foreign Application Priority Data

Dec. 5, 1994 [JP] Japan .................................. 6-300616

[51] Int. Cl.$^6$ ...................................................... G09G 5/00
[52] U.S. Cl. ............................ 345/8; 359/630; 359/738
[58] Field of Search .................... 345/7–9; 348/51–54; 340/980; 349/11; 434/40, 44; 359/13, 14, 629–634, 738–740, 798–803

[56] References Cited

U.S. PATENT DOCUMENTS

| | | | |
|---|---|---|---|
| 5,202,795 | 4/1993 | Kashima . | |
| 5,210,645 | 5/1993 | Orino et al. | 359/738 |
| 5,384,654 | 1/1995 | Iba | 359/630 |
| 5,414,544 | 5/1995 | Aoyagi et al. | 345/8 |
| 5,508,734 | 4/1996 | Baker et al. | 348/53 |

FOREIGN PATENT DOCUMENTS 5-127660  5/1993  Japan .

*Primary Examiner*—Steven Saras
*Attorney, Agent, or Firm*—Cushman, Darby & Cushman IP Group of Pillsbury, Madison & Sutro, LLP

[57] ABSTRACT

An image display apparatus which has a stable field angle independently of each individual observer and the observer's eye point, and which is capable of correcting distortion of an observation image, or which allows the corners of an image display device to be relatively bright. The apparatus has an image display device (3), a device (4) for illuminating it, and an ocular optical system (2) for leading the image of the image display device (3) to an observer's eyeball (1). A field stop (5) is provided in the ocular optical system (2) or between the ocular optical system (2) and the image display device (3), and a light-blocking device (6) is provided between the image display device (3) and the illuminating device (4) such that the distance from the field stop (5) to the image display device (3) and the distance from the image display device (3) to the light-blocking device (6) are approximately equal to each other. Thus, the size of the observation image area determined by the field stop (5) and the size of the observation image area determined by the light-blocking device (6) are made approximately equal to each other, thereby obtaining a stable field angle independently of each individual observer and the observer's eye point.

6 Claims, 7 Drawing Sheets

6

IMAGE DISPLAY APPARATUS

BACKGROUND OF THE INVENTION

The present invention relates to an image display apparatus and, more particularly, to a head- or face-mounted image display apparatus that can be retained on the observer's head or face.

A goggle type head-mounted image display apparatus can be used to enjoy virtual reality or for private image observation purposes. A conventional image display apparatus of the type described above is designed so that an image of an image display device is projected in an observer's eyeball as a magnified virtual image by an ocular optical system. In such a conventional image display apparatus, a field stop provided in the ocular optical system may be set so that the displayed image is made unsharp at the periphery of the image display device, thereby making the edge of the image display surface invisible with a view to enhancing the effect of dynamic presence. In such a case, the observer instinctively sets the image display apparatus so that the eye point is brought close to the ocular optical system because the observer hopes to see the displayed image as far as the edge of the display surface, or in a case where the diopter can be adjusted by moving the display device, the observer tends to set the diopter on the plus side (that is, the display device is brought away from the ocular optical system).

In the art, however, there has been realized no method of preventing the change of the field angle, that is, the change of the observation image area, caused by the adjustment of the eye point position or the diopter.

In not only image display apparatuses but also so-called ocular optical systems in which an object is enlarged with a magnifier or the like and observed with an eye, the exit pupil lies outside the optical system; therefore, the image distortion produced by the ocular optical system is usually observed in the form of pincushion distortion (see U.S. Pat. No. 5,202,795). However, no ocular optical system satisfactorily corrected for image distortion has been realized in the conventional image display apparatuses.

In general, the image distortion produced by an ocular optical system increases as the field angle becomes larger. Further, the display surface of the image display device is usually rectangular, and the boundaries between the image display area and the non-image display area are straight lines. These factors cause the observer to feel that the peripheral portion of the displayed image is particularly distorted to a considerable extent.

As a method of correcting the image distortion, there has been proposed a method in which an image which is to be displayed on an image display device is electrically processed so that the image distortion produced by an ocular optical system can be corrected (see Japanese Patent Application Unexamined Publication (KOKAI) No. 5-127660).

Meanwhile, in an image display apparatus, the light intensity of the displayed image is determined by the accumulation of light emitted from arbitrary positions of a light source for forming the image. Since the quantity of accumulated light is relatively small in the corners of the display surface of an image display device, an image in a corner of the display surface tends to become dark in comparison to images in other regions. Let us explain this phenomenon below with reference to FIGS. 7(a) and 7(b) in the accompanying drawings.

FIG. 7(a) is a perspective view showing a part of the display surface of an image display device in a central or intermediate portion thereof, together with an illuminating device for applying light to the image display device from behind. FIG. 7(b) is a perspective view showing a part of the display surface of the image display device in a corner thereof, together with the illuminating device.

In FIGS. 7(a) and 7(b), reference numeral 30 denotes an image display device, 31 an illuminating device, 32 a minute region on the display surface of the image display device 30 in a central or intermediate portion thereof, and 33 a minute region on the display surface of the image display device 30 in a corner thereof.

The minute display region 32, which lies in the central or intermediate portion of the image display device 30, is illuminated from all directions of the illuminating device 31, which is disposed behind it. Accordingly, a bright image can be provided. The minute display region 33, which lies in a corner of the image display device 30, is illuminated from only specific directions (only from the lower and left sides as viewed in FIG. 7(b)). Further, the display region 33 is illuminated by a larger number of light rays having a large inclination than in the case of FIG. 7(a). Illuminating light rays having an excessively large inclination cannot serve as effective illuminating light. Accordingly, the minute display region 33 in the corner has a lower light intensity than the central or intermediate region 32.

In general, an image display device provides the strongest light intensity in the neighborhood of a direction perpendicular to the display surface thereof; this tendency particularly increases when the inclination of the principal ray with respect to the optical axis of the ocular optical system is large at the periphery of the displayed image.

In a case where light rays from the periphery of the displayed image are regulated by a field stop provided in the ocular optical system also, an image in a corner of the display surface gives an impression that it is dark and unsharp in comparison to images in other regions.

However, there has heretofore been realized no image display apparatus having a light-blocking device which is provided between an image display device and an illuminating device by taking into consideration the above-described circumstances.

In an image display apparatus having a field stop disposed in the optical path, if the observer views the displayed image with his/her eye point brought close to the ocular optical system, the field angle widens, and the displayed image can be observed at a field angle wider than the preset angle. Consequently, there is likelihood that the observer's face or glasses will touch the image display apparatus, or the apparatus will break down because it is used in a forced state. In other words, since the eye point varies according to users, the field angle changes, and it is therefore impossible to provide an image display apparatus having a stable observation image.

On the other hand, if the observer sets the diopter on the plus side in a state where the diopter has been matched with the observer's visual acuity, the image display apparatus is brought into a farsighted state, and it becomes impossible to form a virtual image by the observer's eye. Consequently, the observation image becomes unsharp. Thus, since the observation image is unsharp, the observer has a bad impression despite the widened field of view.

In general, the image distortion produced by an optical system is largely affected by the position of the pupil. In the case of an optical system having positive refractive power, when the stop (pupil) lies on the lens surface, the image distortion is zero. In a camera lens, for example, the image distortion can be corrected by setting the pupil position in the center of the optical system so that the optical system has an approximately symmetric arrangement.

In the case of an ocular optical system which is approximately telecentric on the entrance side, and which enables an optical element to be disposed on the optical axis without being decentered by virtue of the arrangement of the optical system, the exit pupil lies outside the optical system, and therefore, pincushion distortion is usually produced.

When an image display apparatus is to be fitted to the observer's head, it must be small in size and light in weight, and it is therefore desirable to form the apparatus using a minimal number of optical elements. In the case of a magnifier type image display apparatus which uses no reflecting mirror, as the number of constituent elements of the optical system increases, the amount to which the apparatus projects from the observer's face correspondingly increases. Consequently, the weight balance of the observer's head shifts forwardly, causing the observer to feel unstable and to be fatigued. It is also likely that the observer will be physically disordered.

In order to optically correct the image distortion, a complicated lens arrangement must be employed; this gives rise to a problem that the overall size of the apparatus becomes exceedingly large.

If an image which is to be displayed on the image display device is electrically processed so that the image distortion produced by the ocular optical system can be corrected, the load on the electric circuit unfavorably increases, and the cost rises to a considerable extent. In recent years, high-definition display devices have been developed. Under the circumstances, as the number of pixels for displaying an image increases, the number of memories for processing the image correspondingly increases; therefore, the electric circuit inevitably becomes large in size and complicated in arrangement.

As has been described above, the conventional image display apparatus has such a tendency that an image in a corner of the display surface of the image display device looks dark in comparison to images in other regions. If the image for observation is dark, the contrast reduces, and the image gives an impression that it is unsharp. This gives rises to a problem, particularly when it is necessary to display a clear image for observation as far as the corners of the display surface as in the case of the text screen of a computer, for example.

SUMMARY OF THE INVENTION

In view of the above-described problems of the conventional techniques, an object of the present invention is to provide an image display apparatus having a stable field angle independently of each individual observer and also independently of the observer's eye point.

Another object of the present invention is to provide an image display apparatus capable of correcting distortion of an observation image by using an inexpensive light-blocking device without employing a costly electric circuit.

Still another object of the present invention is to provide an image display apparatus in which the difference in light intensity between the corner regions and other regions of an image display device is minimized by providing an inexpensive light-blocking device between an illuminating device and the display device.

To attain the above-described objects, the present invention provides a first image display apparatus having an image display device for displaying an image, a device for illuminating the image display device, and an ocular optical system for projecting an image formed by the image display device and for leading the projected image to an observer's eyeball. In the image display apparatus, a field stop is provided in the ocular optical system or between the ocular optical system and the image display device, and a light-blocking device is provided between the image display device and the illuminating device such that the distance from the field stop to the image display device and the distance from the image display device to the light-blocking device are approximately equal to each other.

In addition, the present invention provides a second image display apparatus having an image display device for displaying an image, a device for illuminating the image display device, and an ocular optical system for projecting an image formed by the image display device and for leading the projected image to an observer's eyeball. In the image display apparatus, a light-blocking device is provided between the image display device and the illuminating device a distance away from the image display device. The light-blocking device has an aperture with a shape which is distorted in inverse relation to image distortion produced by the ocular optical system.

In addition, the present invention provides a third image display apparatus having an image display device for displaying an image, a device for illuminating the image display device, and an ocular optical system for projecting an image formed by the image display device and for leading the projected image to an observer's eyeball. In the image display apparatus, the ocular optical system is a coaxial optical system which is approximately telecentric on the entrance side, and which produces pincushion image distortion. Further, a light-blocking plate having a barrel-shaped aperture is provided between the image display device and the ocular optical system.

In addition, the present invention provides a fourth image display apparatus having an image display device for displaying an image, a device for illuminating the image display device, and an ocular optical system for projecting an image formed by the image display device and for leading the projected image to an observer's eyeball. In the image display apparatus, a light-blocking device is provided between the image display device and the illuminating device. The light-blocking device has enlarged areas for illuminating the corners of the image display device.

In the first image display apparatus of the present invention, a field stop is provided in the ocular optical system or between the ocular optical system and the image display device, and a light-blocking device is provided between the image display device and the illuminating device, whereby the size of the observation image area which is determined by the field stop is made approximately equal to the size of the observation image area which is determined by the light-blocking device, which is provided between the image display device and the illuminating device. Accordingly, even if the observer brings his/her eye point close to the ocular optical system or brings the displayed image away from the ocular optical system by actuating a diopter adjusting mechanism, there is no change in the observation image area. Accordingly, there is no likelihood that the image display apparatus will touch the observer's face or glasses. Thus, the user can wear the image display apparatus on his/her head without feeling uncomfortable. Further, since the image display apparatus is not used in a forced state, it becomes unlikely that the apparatus will break down. Further, since the observer does not forcefully bring the displayed image away from the ocular optical system, it is always possible to view the image in a state where the diopter is matched with the observer's visual acuity.

It is important that the observation image area defined by the field angle, which, in turn, is determined by the field stop, should be made approximately equal to the area that is illuminated through the light-blocking device. By doing so, it is possible to efficiently prevent the user from setting the image display apparatus in a farsighted state.

In the second image display apparatus of the present invention, a light-blocking device which darkens the periphery of the image display area of the image display device is provided between the image display device and the illuminating device, thereby making it impossible for the observer to clearly recognize the boundaries between the image display area and the non-image display area at the periphery of the displayed image. Thus, it becomes possible to prevent the observer from sensing the image distortion produced by the ocular optical system. Further, by providing the light-blocking device with an aperture having a shape which is distorted in inverse relation to image distortion (e.g., barrel or pincushion distortion) produced by the ocular optical system, the boundaries between the image display area and the non-image display area at the periphery of the displayed image can be corrected to approximately straight lines.

In the third image display apparatus of the present invention, pincushion image distortion (as viewed from the observer) which is usually produced by the ocular optical system is corrected by using a light-blocking plate having a barrel-shaped aperture, whereby an observation image which is projected in the form of an image frame that projects outwardly at each corner thereof can be displayed in the form of an image frame surrounded by straight lines.

In the fourth image display apparatus of the present invention, a light-blocking device having enlarged areas for illuminating the corners of the image display device is provided between the image display device and the illuminating device. Thus, since the areas for illuminating the corners of the image display device are enlarged, it is possible to minimize the difference in light intensity between the corner regions and other regions of the image display device.

In this case, if the device for illuminating the image display device has an illuminating surface area which is larger than the display surface area of the image display device, the areas for illuminating the corners of the display surface enlarge. Accordingly, it is possible to utilize a larger amount of light.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the image display apparatus according to the present invention will be described below with reference to the accompanying drawings.

Figure 1:
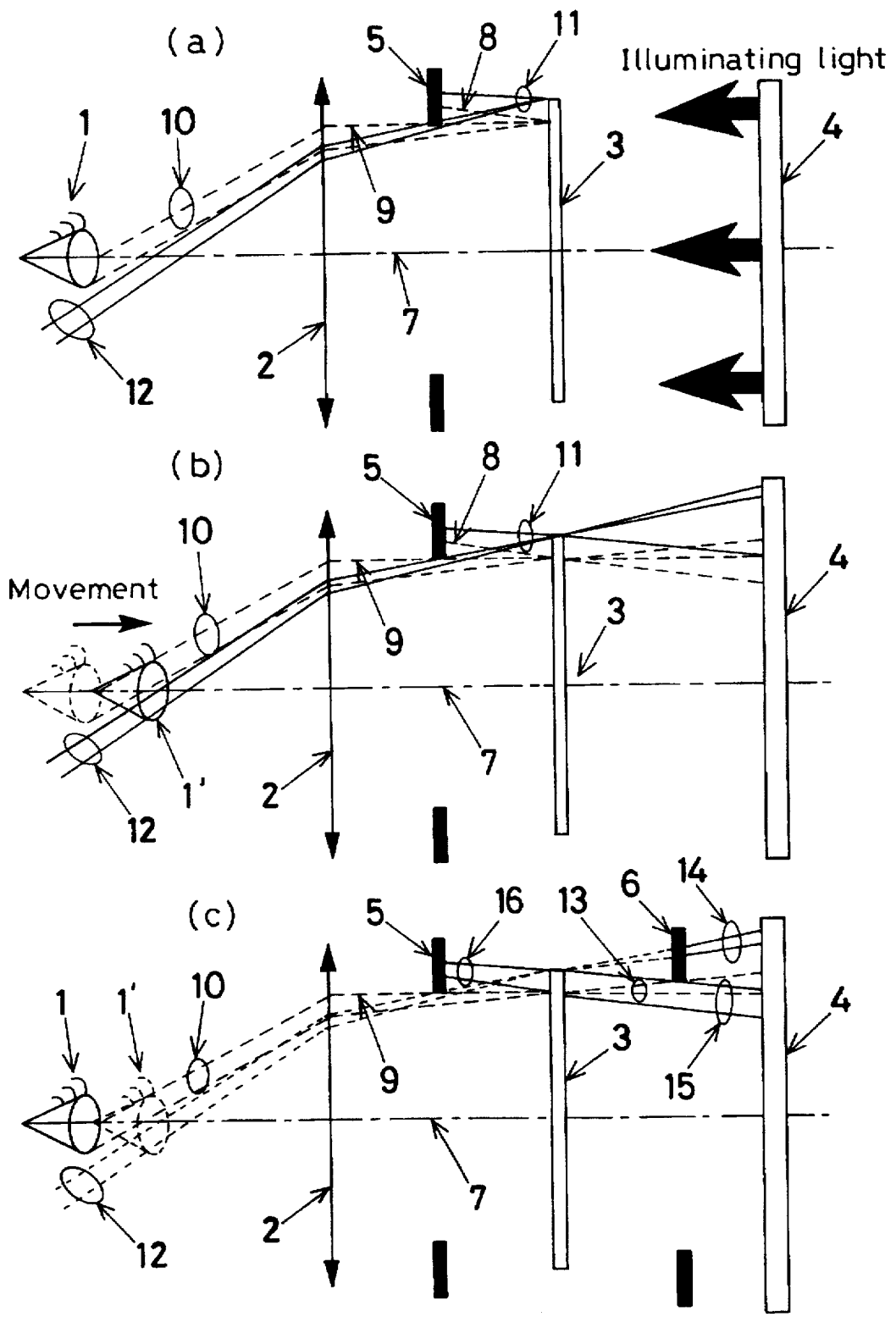
FIG. 1(a) shows the arrangement of the optical system of a conventional image display apparatus.
FIG. 1(b) shows the arrangement of the optical system of the conventional image display apparatus when the eye point is brought closer to an ocular optical system than in the case of FIG. 1(a).
FIG. 1(c) shows the arrangement of the optical system of an image display apparatus according to a first embodiment of the present invention.

FIG. 1(a) shows the arrangement of the optical system of a conventional image display apparatus. FIG. 1(b) shows the arrangement of the optical system of the conventional image display apparatus when the eye point is brought closer to an ocular optical system than in the case of FIG. 1(a). FIG. 1(c) shows the arrangement of the optical system of an image display apparatus according to a first embodiment of the present invention.

In these figures, reference numeral 1 denotes an observer's eye, 1' the observer's eye when the eye point is brought close to an ocular optical system, 2 an ocular optical system, 3 an image display device, 4 an illuminating device, 5 a field stop, 6 a light-blocking device, 7 an optical axis (observer's visual axis), 8 light rays from a peripheral image which are intercepted by the field stop, 9 a principal ray from the peripheral image, 10 lower rays from the peripheral image, 11 light rays from the outermost image, 12 light rays from the outermost image which pass through the field stop, 13 illuminating light for the lower rays 10 emanating from the peripheral image, 14 illuminating light emitted from a portion of the illuminating device 4 above the light 13, 15 illuminating light emitted from a portion of the illuminating device 4 below the upper portion of the light-blocking plate 6, and 16 light rays induced to emanate from the image display device by the illuminating light 15.

Figure 2:
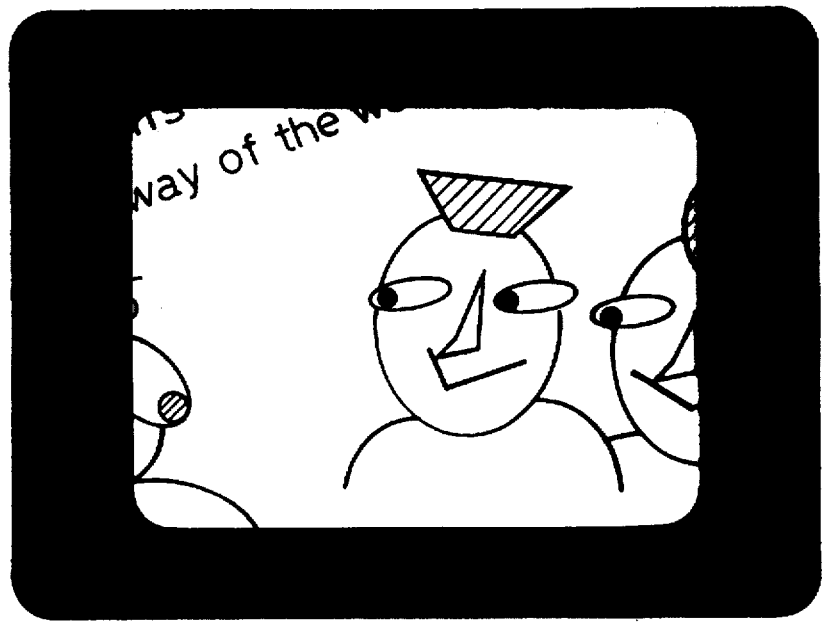
FIG. 2(a) shows an observation image as viewed by using the conventional image display apparatus shown in FIG. 1(a) or the image display apparatus of the present invention shown in FIG. 1(c).
FIG. 2(b) shows an observation image as viewed by using the conventional image display apparatus in the state shown in FIG. 1(b).
Figure 2:
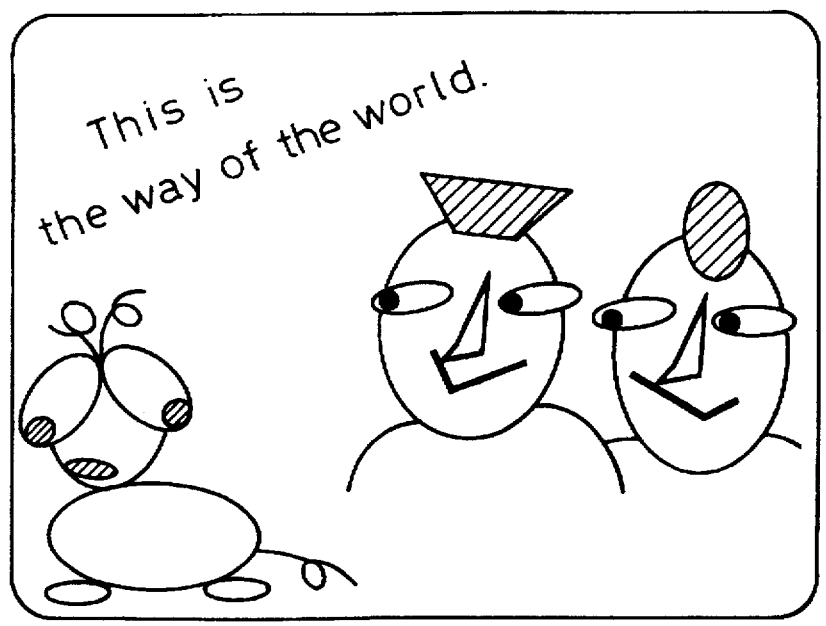

FIG. 2(a) shows an observation image as viewed by using the conventional image display apparatus shown in FIG. 1(a) or the image display apparatus of the present invention shown in FIG. 1(c). FIG. 2(b) shows an observation image as viewed by using the optical system shown in FIG. 1(b) (in a state where the eye point is brought close to the ocular optical system).

A mechanism for preventing movement of the eye point in the image display apparatus of this embodiment will be explained below in detail with reference to FIGS. 1(a), 1(b), 1(c), 2(a) and 2(b).

Referring to FIG. 1(a), the field angle of the image display apparatus is determined by a field stop 5 which is provided between an ocular optical system 2 and an image display device 3. Some rays 8 emanating from the image display device 3 are intercepted by the field stop 5, whereas light rays 10 below a principal ray 9 pass through the field stop 5 and enter an observer's eye 1. The image that emits the rays 10 defines the extremity of a clearly observable image area. The outermost image that emits observable rays is referred to as "peripheral image" (rays concerned with the peripheral image are shown by the dotted lines).

As the distance from the peripheral image increases outwardly, the amount of light reaching the eye 1 decreases; therefore, the observed image gradually darkens. Almost all the ray bundle 11 emanating from the outermost image of the image display device 3 is intercepted by the field stop 5, and the lower rays 12 from the outermost image which pass through the field stop 5 are off the observer's eye 1 and hence invisible (light rays concerned with the outermost image are shown by the solid lines).

Let us assume that an image as viewed under the described conditions is such as that shown in FIG. 2(a). At this time, the observer hopes to look at a wider area of the display surface somehow or other. Accordingly, the observer may bring his/her eye (eye point) close to the ocular optical system 2.

FIG. 1(b) shows the optical system in a state where the observer has brought his/her eye closer to the ocular optical system 2 than the usual position. FIG. 2(b) shows an image as viewed under the conditions of FIG. 1(b).

Under the conditions of FIG. 1(b), the lower rays 12 from the outermost image enter the observer's eye 1', thus making it possible to see as far as the outermost image. Accordingly, the observer has the satisfaction of being able to view the whole displayed image. However, since the image display apparatus is not set in the usual position, it may interfere with the observer's face or glasses, thus inflicting pain on the observer or causing the glasses to be damaged. Further, since the load on the image display apparatus increases, the apparatus may be deformed or damaged.

Accordingly, the image display apparatus in this embodiment is designed so that the observer is prevented from setting his/her eye point as described above. The arrangement of this embodiment is shown in FIG. 1(c). In this embodiment, a light-blocking device (light-blocking plate) 6 is provided between the image display device 3 and the illuminating device 4 in addition to the field stop 5. The distance from the field stop 5 to the image display device 3 and the distance from the image display device 3 to the light-blocking device 6 are made approximately equal to each other.

In FIG. 1(c), light rays which are actually intercepted and hence absent are shown by gray. In this embodiment, there is provided a light-blocking plate 6 having an aperture which allows passage of illuminating light 13 for the lower rays 10 emanating from the peripheral image. In this case, illuminating light 14 which is emitted from a portion of the illuminating device 4 above the rays 13 is intercepted by the light-blocking plate 6. Therefore, the illuminating light 14 cannot reach an image outside the peripheral image. Illuminating light 15 which is emitted from a portion of the illuminating device 4 below the upper portion of the light-blocking plate 6 reaches an image outside the peripheral image, but light rays 16 which are induced to emanate from the image display device 3 by the illuminating light 15 are intercepted by the field stop 5 and therefore do not contribute to the image formation. Accordingly, as the distance from the peripheral image increases outwardly, the amount of illuminating light reduces, and the image gradually darkens.

Even if the observer's eye 1 is brought close to the ocular optical system 2, that is, to the position 1', under the conditions of FIG. 1(c), the illuminating light 14 for the outermost rays 12, which enter the eye 1' in FIG. 1(b), are intercepted by the light-blocking plate 6. Therefore, the outermost image is invisible to the observer's eye 1'. That is, even if the observer brings his/her eye close to the ocular optical system 2, images outside the peripheral image look darker as the distance from the peripheral image increases outwardly. Thus, since there is no change in the way in which the displayed image looks even if the observer brings his/her eye close to the ocular optical system 2, the observer's desire of changing the eye point setting withers.

Thus, it is possible to provide an image display apparatus having a stable field angle by providing an inexpensive light-blocking device between the image display device and the illuminating device.

Figure 3:
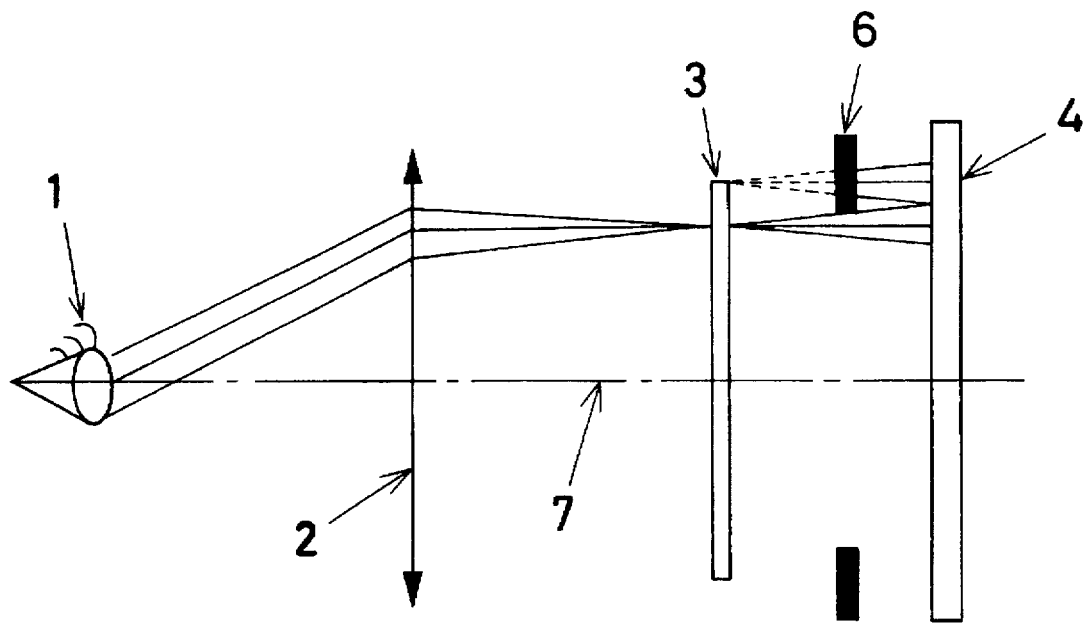
FIG. 3 shows the arrangement of the optical system of an image display apparatus according to a second embodiment of the present invention.
Figure 4:
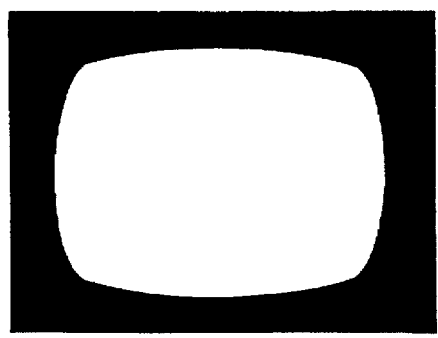
FIG. 4 shows the configuration of a light-blocking plate serving as a light-blocking device in the image display apparatus according to the second embodiment.

FIG. 3 shows the arrangement of the optical system of an image display apparatus according to a second embodiment of the present invention. FIG. 4 shows the configuration of a light-blocking plate serving as a light-blocking device in this embodiment. In FIG. 3, reference numeral 1 denotes an observer's eye, 2 an ocular optical system, 3 an image display device, 4 an illuminating device, 6 a light-blocking device, and 7 an optical axis (observer's visual axis).

The image display apparatus is designed to project an image of the image display device 3 into the observer's eye 1 by the ocular optical system 2. In a case where image distortion is produced by the ocular optical system 2, the edge of the display surface of the image display device 3 looks distorted. Therefore, the light-blocking device 6 is provided between the image display device 3 and the illuminating device 4 a certain distance away from the image display device 3 so as to reduce the amount of light illuminating the outer display surface, thereby making the boundaries between the image display area and the non-image display area unsharp, and thus making it difficult for the observer to sense the distortion of the edge of the image display surface due to the image distortion. Further, by using a light-blocking plate having an aperture with a shape which is distorted in inverse relation to the image distortion produced by the ocular optical system 2 as the light-blocking device 6, the edge of the image display surface can be made to look to be a straight-line shape. Thus, it is possible to prevent the observer from sensing the image distortion even more effectively. As has been described above, the image distortion produced by the ocular optical system 2 which is a coaxial optical system approximately telecentric on the entrance side is usually pincushion distortion. Therefore, if a light-blocking plate 6 having a barrel-shaped aperture, as shown in FIG. 4, is used as the light-blocking device 6, the boundaries between the image display area and the non-image display area become unsharp, and the edge of the observation image can be made to look to be a straight-line shape. It should be noted that, if the image distortion produced by the ocular optical system 2 is barrel distortion, the aperture of the light-blocking plate 6 is formed into a pincushion shape.

Figure 5:
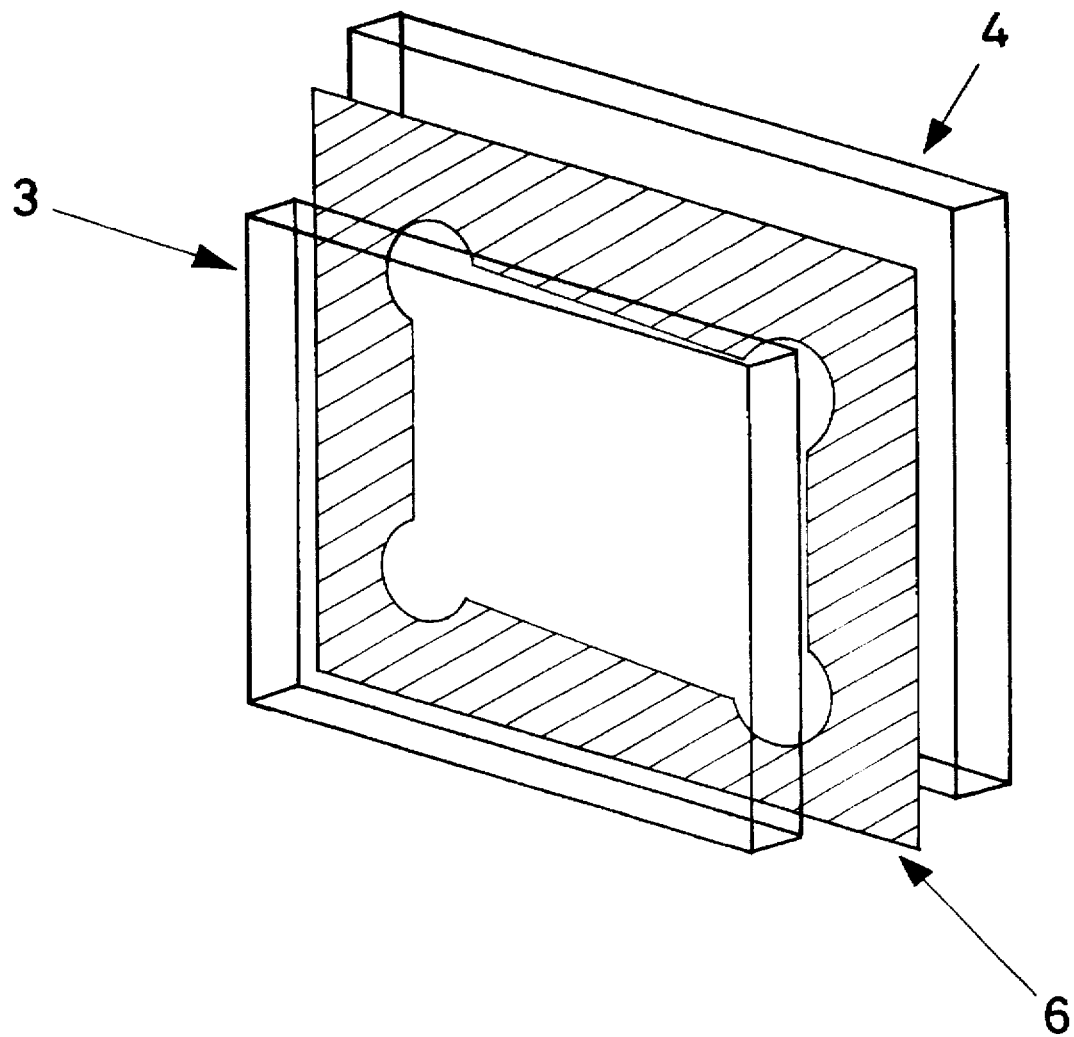
FIG. 5 is a perspective view showing the relationship between an image display device, an illuminating device, and a light-blocking device, which are used in an image display apparatus according to a third embodiment of the present invention.
Figure 6:
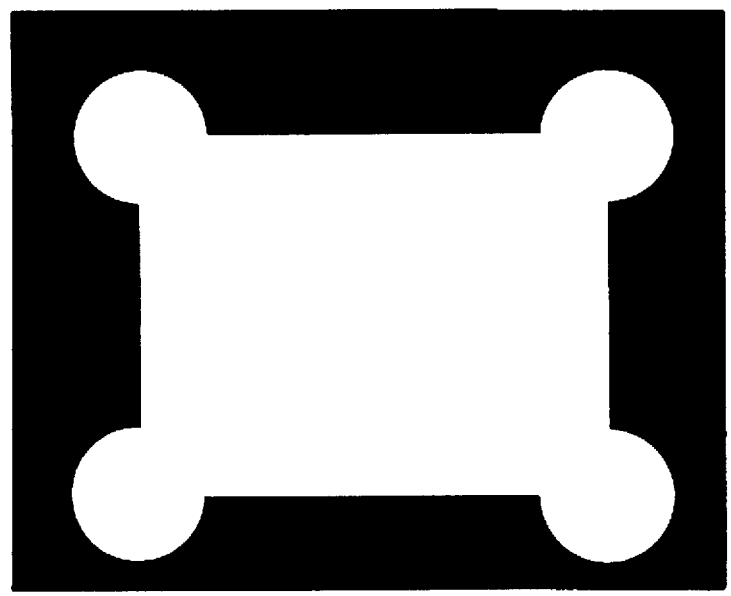
FIGS. 6(a) and 6(b) show examples of the configuration of a light-blocking plate serving as a light-blocking device in the image display apparatus according to the third embodiment.
Figure 6:
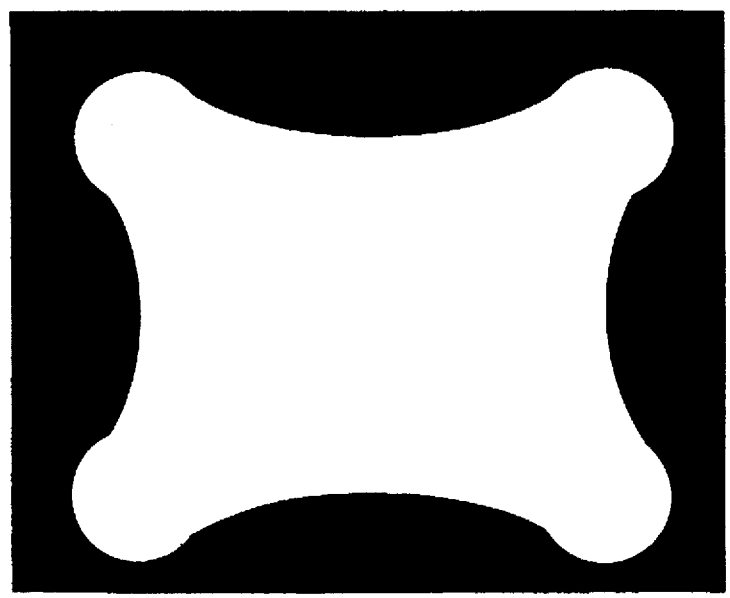
Figure 7A:
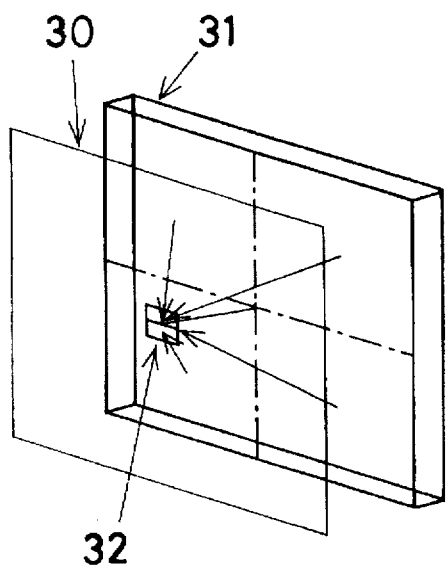
FIGS. 7(a) and 7(b) are perspective views each showing a part of an image display device and an illuminating device which applies light to the image display device from behind.
Figure 7B:
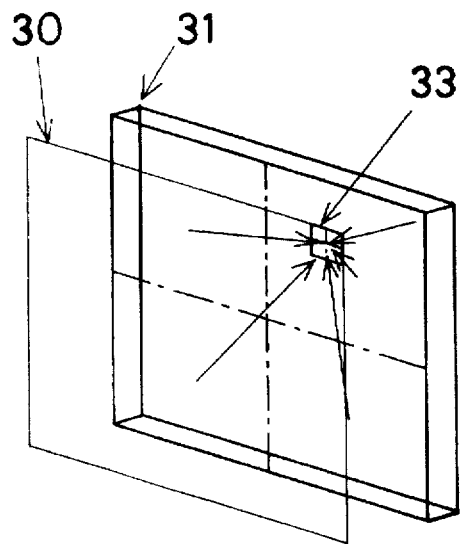

FIG. 5 is a perspective view showing the relationship between an image display device, an illuminating device, and a light-blocking device, which are used in an image display apparatus according to a third embodiment of the present invention. FIGS. 6(a) and 6(b) show examples of the configuration of a light-blocking plate serving as a light-blocking device in this embodiment. In FIG. 5, reference numeral 3 denotes an image display device, 4 an illuminating device, and 6 a light-blocking device. As will be clear from FIG. 5, by enlarging the corner regions of the aperture of the light-blocking plate 6 serving as a light-blocking device, the areas for illuminating the corners of the image display device 3 are enlarged, thus enabling the corners of the image display device 3 to be illuminated from all directions. Accordingly, the numerical aperture at the corners of the image display device 3 increases, and it becomes possible to minimize the difference in brightness between the corner regions and other regions of the image display device 3. The light-blocking plate 6 may have any configuration as long as the aperture has enlarged corner regions. For example, the light-blocking plate 6 may have an aperture such as that shown in FIG. 6(a) or 6(b). Further, it is desirable for the illuminating device 4 to have an illuminating surface area which is larger than the display surface area of the image display device 3. By doing so, the areas for illuminating the corners of the image display device 3 can be enlarged, and the light intensity difference between the corner regions and other regions on the image display device surface can be further reduced.

Although the image display apparatus of the present invention has been described by way of some embodiments, it should be noted that the present invention is not necessarily limited to these embodiments, and that various changes and modifications may be imparted thereto. For example, the configuration of the light-blocking plate 6 in the second or third embodiment may be applied to the light-blocking plate 6 in the first embodiment.

Figure 8:
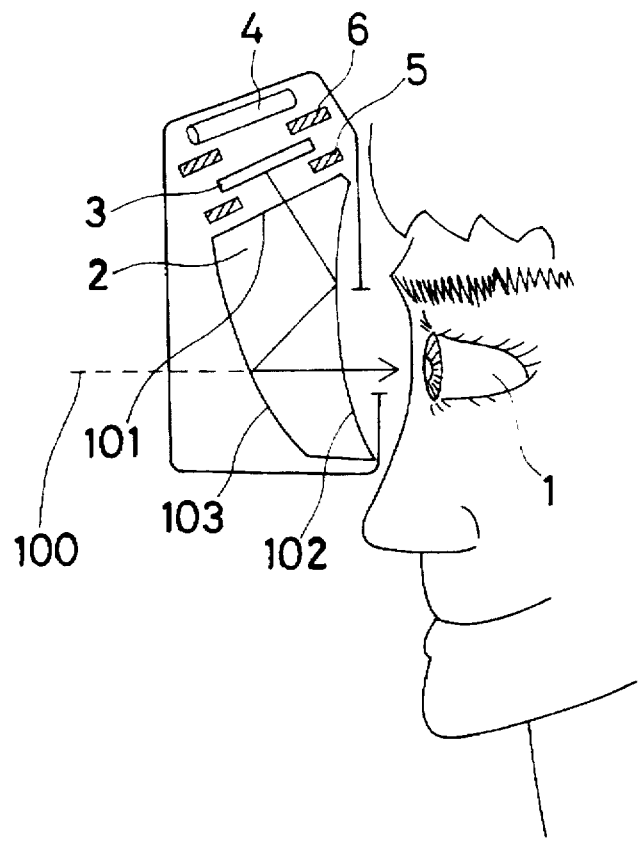
FIG. 8 is a sectional view showing a specific example of an optical system usable in an image display apparatus of the present invention when it is arranged in the form of a head-mounted image display apparatus.

In a case where an image display apparatus arranged as described above is constructed in the form of a head-mounted image display apparatus as a specific example, an optical system is arranged as shown, for example, in the sectional view of FIG. 8. That is, a liquid crystal display device (LCD) 3 is provided as the image display device 3, and a prism 2 is provided as the ocular optical system 2. The prism 2 comprises an entrance surface 101 facing opposite the LCD 3, and a pair of surfaces 102 and 103 facing each other across a transparent medium having a refractive index n larger than 1 (n>1). Assuming that an extension of a straight-line ray which is emitted from the LCD 3 and finally led to the observer's eye 1 is a visual axis 100, the surfaces 102 and 103 each have a concave surface directed toward the observer's eye 1 on the visual axis 100. Further, as in the case of the arrangement shown in FIG. 1(c), the light-blocking plate 6 is disposed between the illuminating device 4 and the LCD 3, and the field stop 5 is disposed between the LCD 3 and the prism 2.

Figure 9:
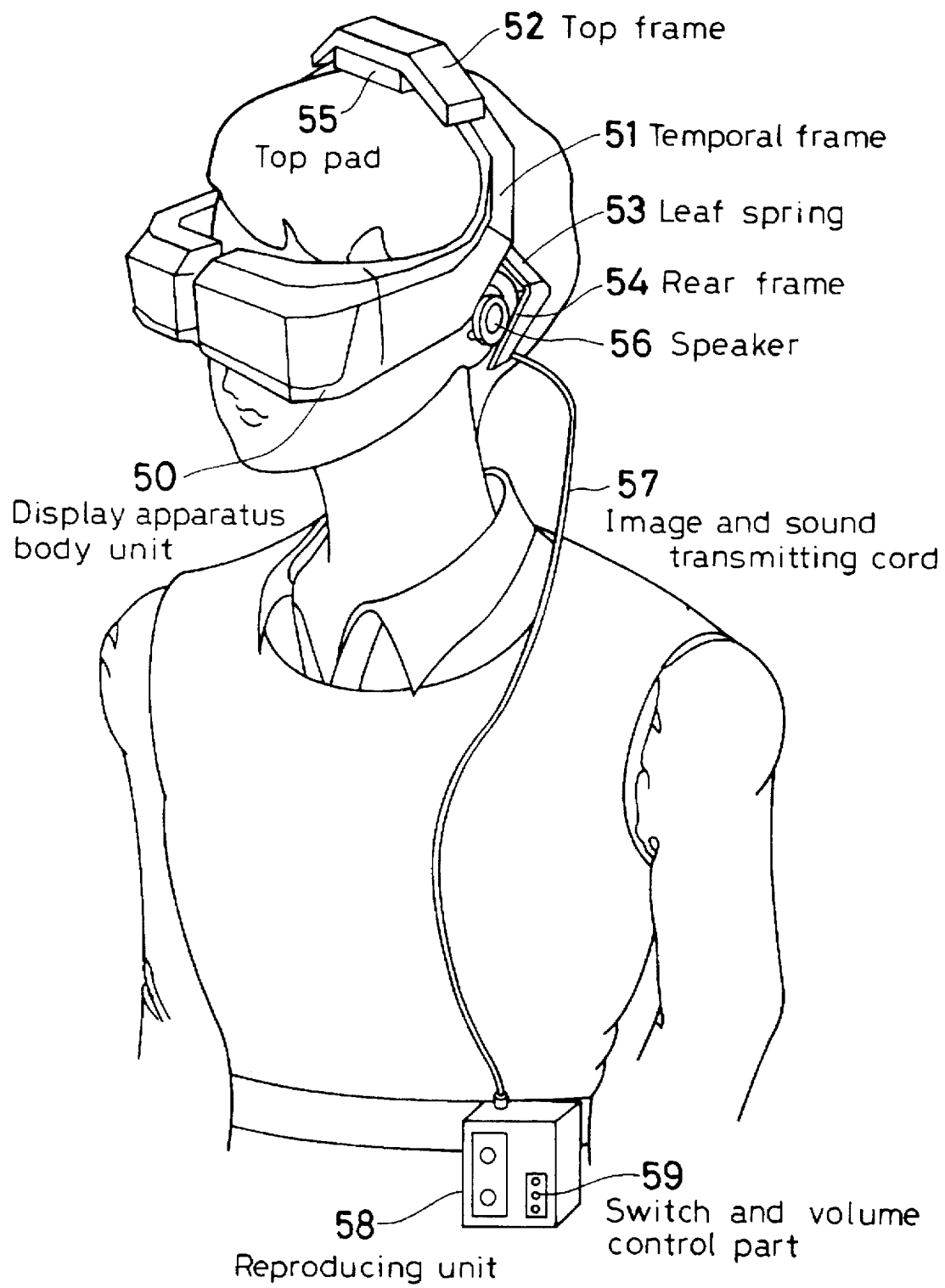
FIG. 9 shows the whole arrangement of an example of a portable head-mounted image display apparatus.

Incidentally, it is possible to form a portable image display apparatus, such as a stationary or head-mounted image display apparatus, which enables the observer to see with both eyes, by preparing a combination of an optical system and an image display device arranged as described for each of the left and right eyes, and supporting the two combinations apart from each other by the interpupillary distance, that is, the distance between the eyes. FIG. 9 shows the whole arrangement of an example of such a portable image display apparatus. A display apparatus body unit 50 contains a pair of left and right optical systems arranged as described above. A pair of image display devices, which comprise LCDs, are disposed on the image planes of the left and right optical systems, respectively. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his/her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g., a portable video cassette unit, through an image and sound transmitting cord 57. Therefore, the user can enjoy not only observing an image but also listening to sound with the reproducing unit 58 retained on a desired position, e.g., a belt, as illustrated in the figure. Reference numeral 59 in the figure denotes a switch and volume control part of the reproducing unit 58. It should be noted that the top frame 52 contains electronic parts such as image and sound processing circuits.

It should be noted that the cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display system may be arranged to receive external radio signals through an antenna connected thereto.

As will be clear from the foregoing description, the image display apparatus of the present invention allows the observer to maintain his/her own eye point and to observe the displayed image with the apparatus set in conformity to the observer's diopter. Accordingly, it is possible to provide an image display apparatus having a stable field angle.

In addition, it is possible to provide an image display apparatus capable of correcting distortion of an observation image by using an inexpensive light-blocking device without employing a costly electric circuit.

In addition, it is possible to provide an image display apparatus in which the difference in light intensity between the corner regions and other regions of an image display device is minimized by providing an inexpensive light-blocking device between the illuminating device and the display device.

What we claim is:

1. An image display apparatus having an image display device for displaying an image, means for illuminating said image display device, and an ocular optical system for projecting an image formed by said image display device and for leading the projected image to an observer's eyeball, said image display apparatus comprising:

a field stop provided in said ocular optical system or between said ocular optical system and said image display device; and light-blocking means provided between said image display device and said illuminating means such that a distance from said field stop to said image display device and a distance from said image display device to said light-blocking means are approximately equal to each other.

2. An image display apparatus according to claim 1, wherein a field angle determined by an aperture of said field stop and a field angle determined by said light-blocking means are approximately equal to each other.

3. An image display apparatus having an image display device for displaying an image, means for illuminating said image display device, and an ocular optical system for projecting an image formed by said image display device and for leading the projected image to an observer's eyeball, said image display apparatus comprising:

light-blocking means provided between said image display device and said illuminating means a distance away from said image display device, said light-blocking means having an aperture with a shape which is distorted in inverse relation to image distortion produced by said ocular optical system.

4. An image display apparatus having an image display device for displaying an image, means for illuminating said image display device, and an ocular optical system for projecting an image formed by said image display device and for leading the projected image to an observer's eyeball, said image display apparatus comprising:

said ocular optical system being a coaxial optical system which is approximately telecentric on an entrance side, and which produces pincushion image distortion; and a light-blocking plate provided between said image display device and said ocular optical system, said light-blocking plate having a barrel-shaped aperture.

5. An image display apparatus having an image display device for displaying an image, means for illuminating said image display device, and an ocular optical system for projecting an image formed by said image display device and for leading the projected image to an observer's eyeball, said image display apparatus comprising:

light-blocking means provided between said image display device and said illuminating means, said light-blocking means having enlarged areas for illuminating corners of said image display device.

6. An image display apparatus according to claim 5, wherein said illuminating means has an illuminating surface area which is larger than a display surface area of said image display device.

* * * * *